United States Patent
Greenspan et al.

(10) Patent No.: US 8,396,771 B2
(45) Date of Patent: Mar. 12, 2013

(54) USING CLOUD BROKERING SERVICES FOR AN OPPORTUNISTIC CLOUD OFFERING

(75) Inventors: Steven L. Greenspan, Scotch Plains, NJ (US); Eitan Hadar, Nesher (IL)

(73) Assignee: CA, Inc., Islandia, NY (US)

( * ) Notice: Subject to any disclaimer, the term of this patent is extended or adjusted under 35 U.S.C. 154(b) by 53 days.

(21) Appl. No.: 12/941,566

(22) Filed: Nov. 9, 2010

(65) Prior Publication Data

US 2012/0116831 A1    May 10, 2012

(51) Int. Cl.
   *G06Q 40/00*    (2006.01)
(52) U.S. Cl. ........................................... 705/35
(58) Field of Classification Search ................ 705/35
   See application file for complete search history.

(56) References Cited

U.S. PATENT DOCUMENTS

| | | | |
|---|---|---|---|
| 6,675,149 B1 * | 1/2004 | Ruffin et al. ................. | 705/7.12 |
| 7,373,325 B1 * | 5/2008 | Hadingham et al. ............ | 705/37 |
| 2010/0319004 A1 * | 12/2010 | Hudson et al. ................. | 719/313 |
| 2011/0029352 A1 * | 2/2011 | Lau et al. ........................... | 705/9 |
| 2011/0145094 A1 * | 6/2011 | Dawson et al. ............. | 705/26.63 |
| 2011/0265077 A1 * | 10/2011 | Collison et al. ................. | 717/172 |
| 2011/0265081 A1 * | 10/2011 | Lucovsky et al. ............. | 717/177 |
| 2011/0265168 A1 * | 10/2011 | Lucovsky et al. ................. | 726/7 |
| 2012/0030672 A1 * | 2/2012 | Zygmuntowicz et al. ........ | 718/1 |

OTHER PUBLICATIONS

U.S. Appl. No. 12/708,879, filed Feb. 19, 2010, inventors Hadar, et al., 36 pages.
U.S. Appl. No. 12/713,557, filed Feb. 26, 2010, inventors Hadar, et al., 34 pages.
U.S. Appl. No. 12/728,616, filed Mar. 22, 2010, inventor Hadar, 33 pages.

* cited by examiner

*Primary Examiner* — Lindsay M. Maguire
(74) *Attorney, Agent, or Firm* — Baker Botts L.L.P.

(57) ABSTRACT

In accordance with one embodiment of the present disclosure, a method comprises publishing descriptions available from a plurality of publishing parties. The descriptions describe a plurality of published services available for a requesting party to request. The method receives requests to broker a transaction from the requesting party, associates a requested service to one of the published services, and facilitates a transaction for the one of the published services.

15 Claims, 3 Drawing Sheets understanding of the present invention and its advantages, reference is now made to the following description taken in conjunction with the accompanying drawings, in which:

USING CLOUD BROKERING SERVICES FOR AN OPPORTUNISTIC CLOUD OFFERING

TECHNICAL FIELD OF THE INVENTION

This disclosure relates generally to cloud computing, and more particularly to using cloud brokering services for opportunistic cloud offerings.

BACKGROUND

In the cloud computing domain, and specifically in the Infrastructure as a Service (IaaS) and Software as a Service (SaaS) domains, service providers may provide specialized services and non-specialized services to consumers. Examples of specialized services may include mortgage services, human resource services, healthcare services, insurance services, and so on. Examples of non-specialized services may include utility computing services for providing memory, processing power, or other computing resources, or commodity services, such as e-mail. In some cases, service providers may have difficulties reaching consumers. At the same time, consumers may have difficulties identifying services offered by service providers.

SUMMARY

In accordance with one embodiment of the present disclosure, a method comprises publishing descriptions available from a plurality of publishing parties. The descriptions describe a plurality of published services available for a requesting party to request. The method receives requests to broker a transaction from the requesting party, associates a requested service to one of the published services, and facilitates a transaction for the one of the published services.

In accordance with one embodiment of the present disclosure, a method comprises determining resource availability for a computing system of an enterprise. The resource availability is compared to a maximum requirements threshold, and if the resource availability exceeds the maximum requirements threshold, services associated with one or more idle resources are offered to consumers external to the enterprise. The method further comprises detecting when the resource availability falls below the maximum requirements threshold and ceasing to offer the services to consumers external to the enterprise.

In accordance with one embodiment of the present disclosure, a method comprises requesting a requested service from a brokering system, obtaining the requested service from a service provider associated with the brokering system, and incorporating the requested service into an existing service to create a custom service.

Technical advantages of certain aspects of the present invention include allowing a party to participate in cloud brokering transactions as both a consumer of services and a provider of services. One potential advantage of participating as both a consumer and a provider may be to enable a party to provide a custom service created from one or more services that the party received from others. Another technical advantage may be that an account may be maintained for a party. The account may be credited when the party provides services and debited when the party receives services in order to create a simplified bill for net transactions. In some embodiments, the bill may reflect brokerage fees for transactions performed by the broker. As another example, a technical advantage may be that a service provider may offer services opportunistically on a transient basis according to the service provider's current capacity, requests from consumers for customized services, or other criteria. As yet another example, transactions may be established efficiently between parties by assisting the parties in finding one another and negotiating services. In some embodiments, service level agreements or contract negotiations may be performed between a broker and each party prior to initiating any transactions so that the parties are not required to negotiate contracts among themselves. Accordingly, transaction costs may be reduced and transactions which may not have otherwise occurred (such as transactions for short term services) may be transacted.

Other technical advantages of the present disclosure will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description taken in conjunction with the accompanying drawings, in which.

DETAILED DESCRIPTION

Figure 1:
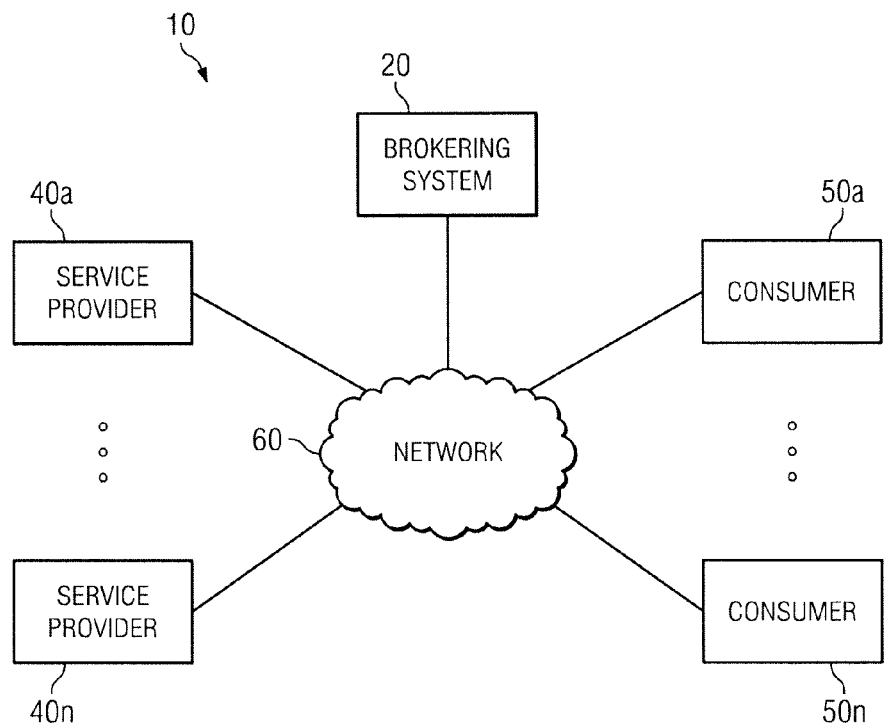
FIG. 1 illustrates an example of a cloud computing system comprising a brokering system, a service provider, and a consumer.

FIG. 1 illustrates a cloud computing system 10, according to certain embodiments. Cloud system 10 includes a brokering system 20, one or more service providers 40, and one or more consumers 50. Brokering system 20, service providers 40, and consumers 50 may be communicatively coupled by a network 60. Brokering system 20 is generally operable to facilitate transactions between service providers 40 and consumers 50 by receiving requests to broker a transaction, matching a service provider 40 with a consumer 50, and initiating the transaction. A service provider 40 may refer to a party that provides services, and a consumer 50 may refer to a party that receives services. A particular party may participate in transactions with brokering system 20 as a service provider 40, a consumer 50, or both.

A service may refer to any service associated with computing resources, computer memory, computing processing power, computer storage, computer applications, or any other processing or exchange of electronic data, such as IaaS and/or SaaS services. Services may be specialized or non-specialized. Examples of specialized services may include mortgage services, human resource services, healthcare services, insurance services, and so on. Examples of non-specialized services may include utility computing services for providing computer memory, processing power, or other computing resources, or commodity services, such as e-mail. In some embodiments, services may be offered on an ad hoc or opportunistic basis. An example of an opportunistic offering may be a service offered during a time period when service provider 40 is experiencing a capacity surplus. A capacity surplus may occur when service provider 40 is able to meet the demands associated with its internal operations without reaching system capacity.

Services may be provided to consumers 50 for limited or unlimited amounts of time. For example, consumers 50 may purchase discrete amounts of time during which consumers 50 are allowed to access and use a software application provided by a particular service provider 40. As another example, consumers 50 may choose to purchase computing resources, such as memory or processing power, on an open-ended or long-term basis. In some embodiments, consumers 50 may execute their own software applications using the computing resources provided by the service provider 40.

In order to facilitate transactions, brokering system 20 may publish descriptions of services available to be transacted. Publishing the descriptions may refer to communicating the descriptions to service providers 40 and/or consumers 50, for example, by including the descriptions on a website associated with brokering system 20 or by sending a notification to one or more service providers 40 and/or consumers 50. Brokering system 20 may receive the descriptions from publishing parties. A publishing party may be a service provider 40 or a consumer 50. Descriptions received from service providers 40 may describe services being offered for purchase, whereas descriptions received from consumers 50 may describe services that consumers 50 seek to purchase. The description may include characteristics of the service, such as the name, type of service, functionality, availability time, price, service level and performance characteristics, and/or other characteristics.

A requesting party may send brokering system 20 a request to broker a transaction that specifies a requested service. In some embodiments, the requesting party may be a consumer 50, and the requested service may correspond to a published service being offered for purchase by a service provider 40. In some embodiments, the requesting party may be a service provider 40, and the requested service may correspond to a published service that a consumer 50 is seeking to purchase. That is, service provider 40 may request to provide the service that consumer 50 seeks.

Upon receiving the request to broker the transaction for the requested service, brokering system 20 may match the requested service to one of the published services. The matching may include matching one or more characteristics of the request to one or more characteristics of the published service. For example, a published service offered by a service provider 40 may be for the use of processing power between the hours of 7:00 p.m. and 7:00 a.m. A requested service requested by a consumer 50 may be for the use of processing power between the hours of 8:00 p.m. and 10:00 p.m. Brokering system 20 may determine that the service provider 40 is able to provide the service requested by consumer 50, and may perform a match. Brokering system 20 may identify the publishing party associated with the published service that matches the requested service and facilitate the transaction between the requesting party (consumer 50) and the publishing party (service provider 40).

Brokering system 20 may be further operable to facilitate negotiations between requesting parties and publishing parties. Any suitable characteristics may be negotiated by the parties, such as price, availability time, service level, and so on. For example, the parties may negotiate a discounted price based on volume, service bundling, deferred fulfillment, or other negotiated characteristic. To illustrate, a service provider 40 may offer a published service that would allow a consumer 50 to use a software application during peak time hours for full price. Consumer 50 may propose to use the software application during off-peak time hours for a discounted price. As another example, the parties may negotiate to defer fulfillment of the requested service in exchange for a price that is discounted from the amount charged for immediate fulfillment of the service. For example, a photo printing service may charge full price to deliver photos within one week and may charge half-price to defer delivery by three weeks. Upon receiving a proposal, a party may initiate an acceptance, a rejection, or a counter-offer via brokering system 20. In some embodiments, a proposal may include an expiration time after which the proposal is no longer valid. Once the parties have agreed to the terms, brokering system 20 may initiate the transaction. The transaction may be initiated by sending a token to the parties that allows consumer 50 to access services of service provider 40 or by any other suitable method.

In some embodiments, a consumer 50 may negotiate with multiple service providers 40 in order to obtain the most favorable terms available for different components of a requested service. For example, consumer 50 may request a service comprising web-hosting and data storage. Consumer 50 may negotiate to receive web-hosting and data storage from a single service provider 40. Alternatively, consumer 50 may receive the web-hosting from one service provider 40 and the data storage from another service provider 40.

Brokering system 20 may be further operable to group consumers for any suitable purpose such as time sharing, volume discounts, group purchase, or other purpose. As an illustration, a particular service provider 40 may offer data storage over a computer network in 50 megabyte and 100 megabyte increments. The price for a 100 megabyte increment is discounted from the price of two 50 megabyte increments. One particular consumer 50 requests 50 megabytes of storage, another particular consumer 50 requests 25 megabytes of data storage, and another particular consumer 50 requests 25 megabytes of data storage. Brokering system 20 may group the three consumers 50 into a buyer group, and notify the offering service provider 40 that the buyer group is willing to purchase its offered service. Service provider 40 provides 100 megabytes of data storage to the three requesting consumers 50 at a price discounted from the price of purchasing two 50 megabyte increments. As a result, the three requesting consumers 50 obtain a price for data storage discounted from a price they would otherwise be able to obtain, without having to coordinate among themselves. Consumers 50 may pay according to a minimum price set by the particular service provider 40 and/or brokering system 20, and/or the amount of data storage actually consumed. Similar volume discounts may be obtained for other services, including, but not limited to, software applications executing over a computer network, and processing time offered over a computer network.

In some embodiments, brokering system 20 may increase the efficiency with which transactions are established between parties. As an example, by providing a centralized point of contact through which the parties may initiate transactions, service providers 40 may more readily identify potential consumers 50 and consumers 50 more readily identify potential service providers 40. Additionally, it may not be practical for a party to independently negotiate contracts with each of the other parties associated with brokering system 20, particularly for short-term services. Brokering system 20 may alleviate this problem by approving a party prior to allowing the party to participate in transactions. A party may be approved only if certain requirements are met, for example, credit-worthiness requirements and/or service level requirements. As used in this application, service level requirements may refer to any requirement associated with computing systems or the handling of data. Examples of service level requirements may include security and privacy requirements, such as compliance with data management, data encryption, or anti-virus scanning policies, or performance requirements, such as availability or uptime requirements.

Any suitable means may be used to implement the requirements within brokering system 20. As an example, brokering system 20 may comprise a number of consortia, and each consortium may have its own approval requirements (e.g., service level requirements) for participating in transactions with other members of the same consortium. Different consortia may or may not overlap with one another. If the consortia overlap, a party may belong to more than one consortium as long as it meets the requirements of each consortium to which it belongs. In some embodiments, a consortium may include certain restrictions, for example, competitors may be restricted from belonging to the same consortium. Upon receiving a request for a transaction, brokering system 20 may compare the consortium associated with the requesting party to the consortium associated with the publishing party and allow the transaction only if the parties belong to the same consortium.

In some embodiments, the service level requirements associated with brokering system 20 (or a consortium thereof) may be less stringent than the needs of a particular service provider 40 or consumer 50. In order to accommodate the needs of the particular party, brokering system 20 may allow the party to specify a required level of service. For example, when brokering system 20 receives a request for a service, it may determine whether the requesting party requested a particular service level. If a particular service level is requested, the brokering system 20 may allow the transaction only if the identified publishing party is operable to meet or exceed the particular service level.

As an example, a consumer 50 may wish to increase the uptime requirement for the service. Accordingly, consumer 50 may specify a consumer service level describing the uptime requirement when requesting a service or sending a service description to be published. Brokering system 20 may use the consumer service level when performing a match by comparing the consumer service level to a provider service level offered by a service provider 40. The match may be completed and the transaction allowed only if the provider service level meets or exceeds the consumer service level. Service provider 40 may choose to negotiate an increased price for the service offering to reflect the more stringent service level.

As another example, a service provider 40 may wish to restrict consumers 50 from accessing its assets if the consumers 50 fail to meet certain requirements, such as a requirement to comply with data management policies or a requirement that the consumer 50 is not a competitor of service provider 40. Brokering system 20 may be operable to ensure that only qualified consumers 50, that is, consumers 50 that meet the requirements, are allowed to perform transactions with the particular service provider 40.

Brokering system 20 may maintain an account for each party that performs transactions using brokering system 20. The account may be credited for each provider transaction in which the party provided a service and debited for each consumer transaction in which the party received a service. Thus, the party may receive a simplified bill reflecting net payments owed or earned. In some embodiments, brokering system 20 monitors service level agreements associated with the fulfillment of the service to provide billing, metering, usage monitoring, and/or any other appropriate quality assurance to service providers 40 and/or consumers 50. Brokering system 20 may adjust account balances according to the monitoring, for example, by charging consumer 50 an overage fee for use of the service beyond the agreed number of minutes, bytes, etc., or by providing consumer 50 a credit if service provider 40 fails to meet the agreed service level.

The account balance maintained by brokering system 20 may be debited to reflect a brokerage fee charged by brokering system 20. The brokerage fee may be a fixed fee or a variable fee, such as a percentage of transaction price. Brokering system 20 may charge fees for advertising, publishing service offerings, making matches, processing bills and payment, surveying and trending usage (what consumers are requesting), trending service offerings (what providers are offering), and/or other brokering services that it provides. In some embodiments, brokering system 20 may purchase a service from a service provider 40 and may sell the service to a consumer 50 in order to collect an arbitrage fee.

The cloud system described may provide one or more advantages. One advantage may be that a service provider 40 may maximize capacity utilization of its information technology resources. For example, a service provider 40 may have made a capital investment in physical assets that may be under-utilized by the service provider 40 during non-peak times (e.g., time periods when the internal demand for services is low). Rather than allowing the excess services to remain idle, the service provider 40 may offer the excess services to external consumers 50. Consumers 50 may benefit by obtaining access to services through service providers 40 without having to make capital investments in the physical assets required to support the services. Consumers 50 may access services on an ad hoc basis as needed or on a reserved basis to meet planned needs.

In some embodiments, service provider 40 may offer services that leverage its skills in a particular area. That is, service provider 40 may have made a capital investment in specialized services that may be under-utilized by the service provider 40 during non-peak times. As an example, a bank may offer financial data processing services to external consumers 50 in the event of a capacity surplus. The bank may have the option of approving only certain consumers 50 to access its systems, such as non-competitor consumers 50 that comply with the bank's data management policies.

In some embodiments, services may be offered on a transient basis for a limited duration according to a regular schedule (e.g., 3:00 a.m. to 6:00 a.m.) or on an ad hoc basis. To illustrate, a service provider 40 may determine resource availability for a computing system of an enterprise associated with the service provider 40. The resource availability may be compared to a maximum requirements threshold. The maximum requirements threshold may be configured to any suitable value, for example, a value selected to ensure that the demands of consumers internal to the enterprise are adequately met. If the resource availability exceeds the maximum requirements threshold, service provider 40 may offer services associated with one or more idle resources to consumers 50 external to the enterprise. Service provider 40 may continue to monitor resource availability. If the resource availability falls below the maximum requirements threshold, service provider 40 may cease offering services to consumers 50 external to the enterprise. In some embodiments, service provider 40 may adjust the price offered for services based on resource availability. As an example, service provider 40 may charge a lower price for services when 90% of its resources are idle and may charge a higher price if only 20% of its resources are idle. Thus, service provider 40 may provide rapid opportunities for access to services as well as price discounts based on the current available capacity of the computing systems associated with service provider 40.

In some embodiments, service provider 40 may regularly schedule when services are offered and/or discounted. For example, service provider 40 may detect under-utilization time periods for which the resource availability regularly exceeds the maximum requirements threshold and may offer services for the under-utilization time periods according to a regular schedule. As an example, under-utilization time periods may include evenings and/or weekends.

Another technical advantage of certain embodiments may be that service providers 40 may be proactive with revenue generation. Brokering system 20 may assist service providers 40 in scheduling services purchased by consumers 50. Service providers may balance their internal capacity and job scheduling, such as maintenance downtimes, to accommodate consumers 50. Thus, resources may be available to consumers 50 during peak revenue-generating time periods.

As yet another example, an advantage of certain embodiments may be that a party may act as both a service provider 40 and a consumer 50 in order to provide custom services to end user consumers 50. As an example, a party may request a requested service from a brokering system, obtain the requested service from a service provider 40 associated with the brokering system, and incorporate the requested service into an existing service to create the custom service. The party may then request the brokering system 20 to publish the custom service and provide the service to consumers 50.

Custom services may be created opportunistically as a need is perceived by the requesting party or upon request of an end user consumer 50. The services comprising the custom service may be specialized or non-specialized. For example, a service provider 40 may purchase processing power in order to run the service provider's specialized services for end user consumers 50. As another example, service provider 40 may purchase a specialized service, such as a mortgage application, to be incorporated in a specialized service of service provider 40, such as a banking application, and the banking-mortgage service may be offered to end user consumers 50.

Brokering system 20 may create an open market where consumers may window shop and barter for the price and other service terms. The open market environment may provide service providers 40 with exposure in order to capture an audience for the services. Thus, service providers 40 may easily introduce a service and see if consumers 50 are receptive. Successful service offerings may be gradually ramped up, and unsuccessful service offerings may be discontinued. For example, service providers 40 may decide to stop offering a service if a utilization rate of the service falls below a minimum utilization rate for a selected time period. In some embodiments, the minimum utilization rate may be the utilization rate at which the service becomes profitable. The time period may be relatively short term, such as one month, to evaluate the service offering. Accordingly, brokering system 20 may lower the barrier to entry for service providers that are providing experimental services for which the market demand is unknown.

By creating an open market environment, brokering system 20 may offer increased flexibility for transacting services. As described above, a party may participate in some transactions as a service provider 40 and other transactions as a consumer 50. Additionally, publishing may be performed by a service provider 40 that wants to sell services or by a consumer 50 that seeks to purchase services. That is, in some embodiments, the consumer 50 may publish a set of requirements and a price, and service providers 40 can accept or negotiate the offer depending on their projected or actual service loads.

Figure 2:
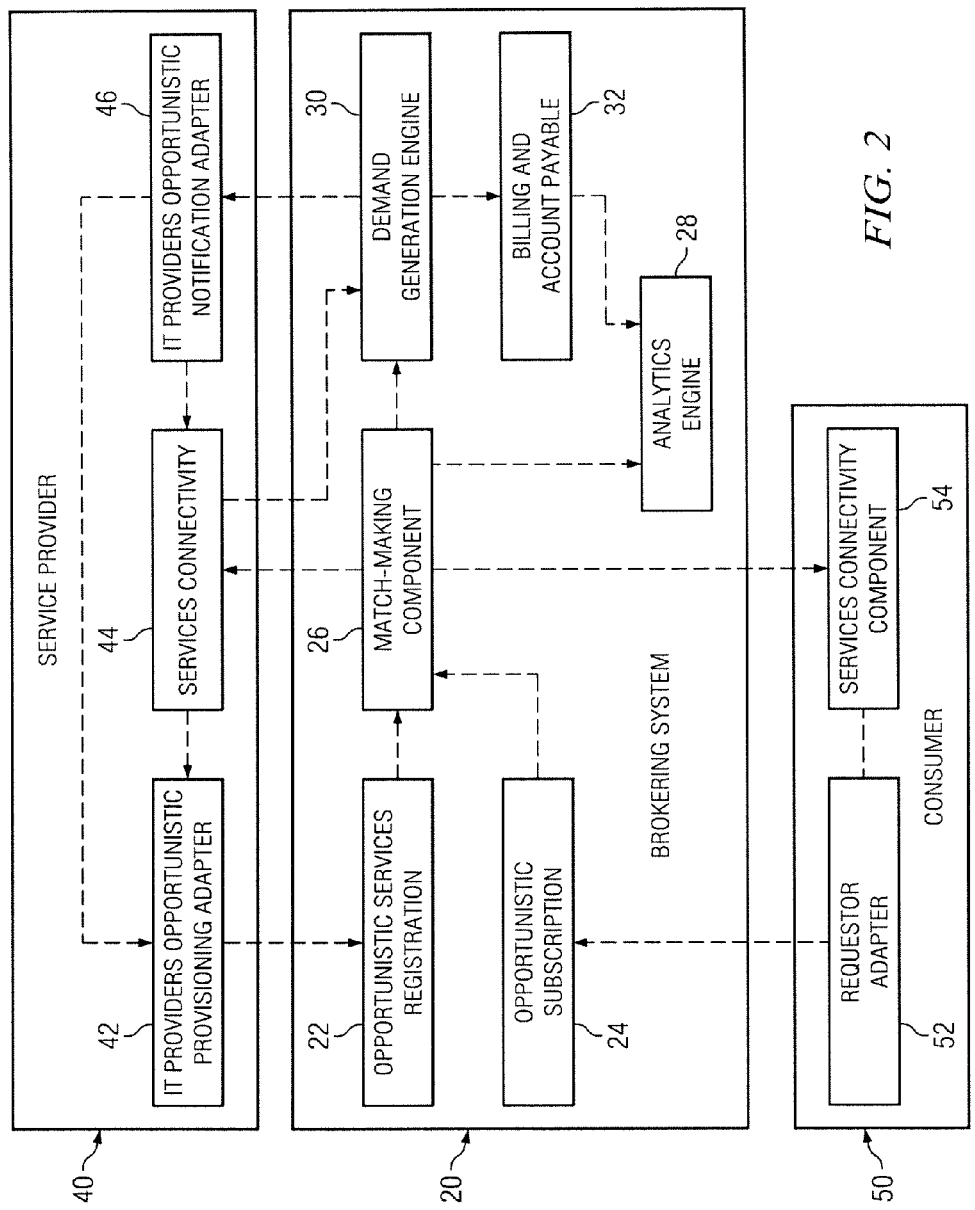
FIG. 2 illustrates examples of components of the brokering system, the service provider, and the consumer of FIG. 1.

FIG. 2 illustrates examples of components of brokering system 20, service provider 40, and consumer 50 of FIG. 1. As described above, brokering system 20 may enable matchmaking and facilitate negotiations between potential service providers 40 and consumers 50. Brokering system 20 may comprise an opportunistic services registration component 22, an opportunistic subscription component 24, a matchmaking component 26, an analytics engine 28, a demand generation engine 30, and a billing and accounting component 32.

Registration component 22 may enable service providers 40 to register services offerings. Services may be registered in an active or dormant configuration. Active services may refer to services that service provider 40 currently offers. Accordingly, brokering system 20 may be authorized to initiate transactions for active services upon receiving a request for the active services. Dormant services may refer to services that service provider 40 is capable of fulfilling, but does not currently offer. Brokering system 20 may be authorized to forward requests for dormant services to service provider 40, and service provider 40 may choose to activate the dormant services if it accepts the proposed terms of service. In some embodiments, registration component 22 can block consumers 50 that do act according to agreed commitments, such as consumers 50 that fail to make timely payments.

Opportunistic subscription component 24 may allow consumers 50 to view published services, including active services and/or potential (dormant) services. Consumers 50 may view the specifications and details of the services to assist in determining whether to purchase a particular service. Subscription component 24 may allow consumers 50 to request one or more services. In some embodiments, consumers 50 may request several alternative services according to preference and a set of subscription rules, such as time of day, signaling bandwidth, distance, and so on. In some embodiments, subscription component 24 may block providers who routinely fail to meet SLAs and other agreed upon agreed upon commitments.

Match-making component 26 may match the services offered by service providers 40 to services requested by consumers 50. Matches may be made according to any suitable criteria, such as type of service, service requirements, priority level or preference, and so on. In some embodiments, matchmaking component may balance requests for active services among service providers 40. In some embodiments, matchmaking component 26 may calculate a match-making fee for performing the match.

Analytics engine 28 may generate historical demand and offerings lists. The lists may be analyzed to identify trends in potential services that brokering system 20 is involved with, for example, by classification. The trends may be used to determine the types of services that may be most profitable for brokering system 20 to transact. Similarly, brokering system 20 may provide or sell trend data to service providers 40 to allow service providers 40 to tailor service offerings to market demands.

Demand generation engine 30 may accommodate requests from consumers 50 that match-making component 26 was unable to fulfill, for example, because the requested service was not active or not offered. Demand generation engine 30 may send the consumer's criteria to service providers 40 that may potentially have the capabilities to fulfill the request, such as service providers 40 that offer identical services, however, at different availability times, or at different costs, etc. Demand generation engine 30 may facilitate negotiations between the parties and initiate a transaction if an agreement is reached.

Billing and Accounting Component 32 may bill accounts associated with both the service providers 40 and consumers 50. Overall charges or revenue payments may be transacted periodically, such as monthly. Brokering system 20 may collect the payments and transfer them to service providers 40 on a periodic basis. If service provider 40 is also a consumer 50 of other services, billing and accounting component 32 will balance the payments owed and earned, and deliver only the balance. In some embodiments, payments are made to service providers 40 only after the funds are collected. The payment schedule may be determined by the contractual agreements between the broker and the service providers and consumers. Notably, a single broker may handle payment arrangements for many different consortia.

In some embodiments, service provider 40 may comprise an opportunistic provisioning adapter 42, a services connectivity component 44, and an opportunistic notification adapter 46.

Provisioning adapter 42 may enable service provider 40 to publish the potential services offering (what) and the associated provisioning time (when) for consumers 50 to view. If a potential service is not publicly available, even for a limited period of time, it may be published without any availability options and denoted as dormant.

Services connectivity component 44 may provide an activation code which may be used to activate a service. Connectivity component 44 may monitor payments earned by service provider 40, for example, based on the activation code.

Notification adapter 46 may receive notifications requesting a potential service that is not active (e.g., a dormant service). In some embodiments, notification adapter 46 may conduct negotiations on behalf of service provider 40 in order to define an agreed tailored service for consumer 50. When a dormant service is allocated, service provider 40 may send a token indicating the identity of the requested service, its duration, its availability time, and the consumer 50 for whom it is allocated.

In some embodiments, consumer 50 may comprise a requestor adapter 52 and a services connectivity component 54. Requestor adapter 52 may enable consumer 50 to subscribe to services registered in brokering system 20, define criteria for the services, and accept potential alternative services in the event that aspects of the service are negotiated via brokering system 20.

Connectivity component 54 may be similar to connectivity component 44 associated with service provider 40. That is, connectivity component 54 may provide an activation code which may be used to activate a service. Connectivity component 54 may monitor charges owed by consumer 50, for example, based on the activation code.

Figure 3:
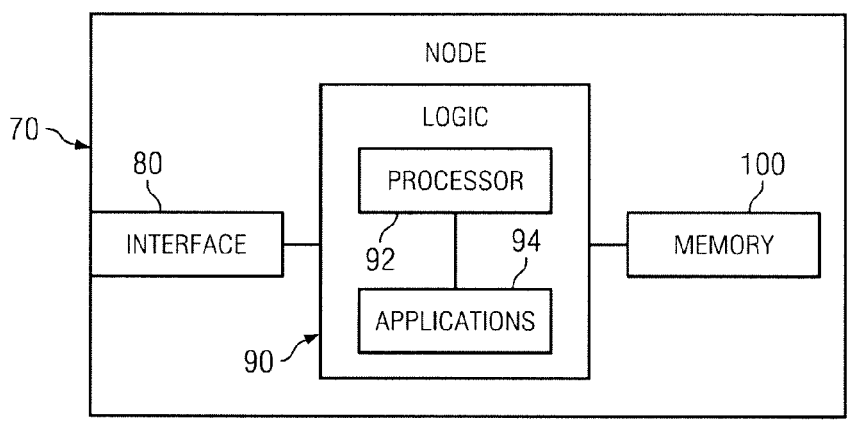
FIG. 3 illustrates an example of a node that may be configured as the brokering system, the service provider, or the consumer of FIG. 1.

FIG. 3 illustrates an example of a node 70 that may be configured as brokering system 20, service provider 40, or consumer 50 of FIG. 1. Node 70 may comprise any suitable combination of hardware and/or software implemented in one or more modules to provide the described functions and operations. In some embodiments, node 70 may comprise a general-purpose personal computer (PC), a Macintosh, a workstation, a Unix-based computer, a server computer, or any suitable processing device. In some embodiments, the functions and operations described above may be performed by a pool of multiple nodes 70.

In certain embodiments, node 70 may include an interface 80, logic 90, memory 100, and/or other suitable element. Interface 80 receives input, sends output, processes the input and/or output, and/or performs other suitable operation. In certain embodiments, node 70 may be configured as a brokering system and interface 80 may receive a request for a service as an input, perform a match, and generate a token for accessing the service as an output. Interface 80 may comprise hardware and/or software.

Logic 90 performs the operations of the component, for example, executes instructions to generate output from input. As an example, in certain embodiments, logic 90 of a brokering system may compare the services offered by a service provider to the services requested by a consumer and facilitate a transaction if the offered services match the requested services.

Logic 90 may include hardware (such as one or more processors 92), software (such as applications 94), and/or other logic. Logic 90 may be encoded in one or more tangible, non-transitory media and may perform operations when executed by a computer. Certain logic 90, such as a processor 92, may manage the operation of a component. Examples of a processor 92 include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 100 stores information. Memory 100 may comprise one or more tangible, non-transitory computer-readable, and/or computer-executable storage medium, and may exclude signals or carrier waves. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Nodes 70 may be communicatively coupled via one or more networks 60 as illustrated in FIG. 1. Network 60 may represent any number and combination of wireline and/or wireless networks suitable for data transmission. Network 60 may, for example, communicate Internet protocol packets, frame relay frames, asynchronous transfer mode cells, and/or other suitable information between network addresses. Network 60 may include one or more intranets, local area networks, metropolitan area networks, wide area networks, cellular networks, all or a portion of the Internet, and/or any other communication system or systems at one or more locations.

Figure 4:
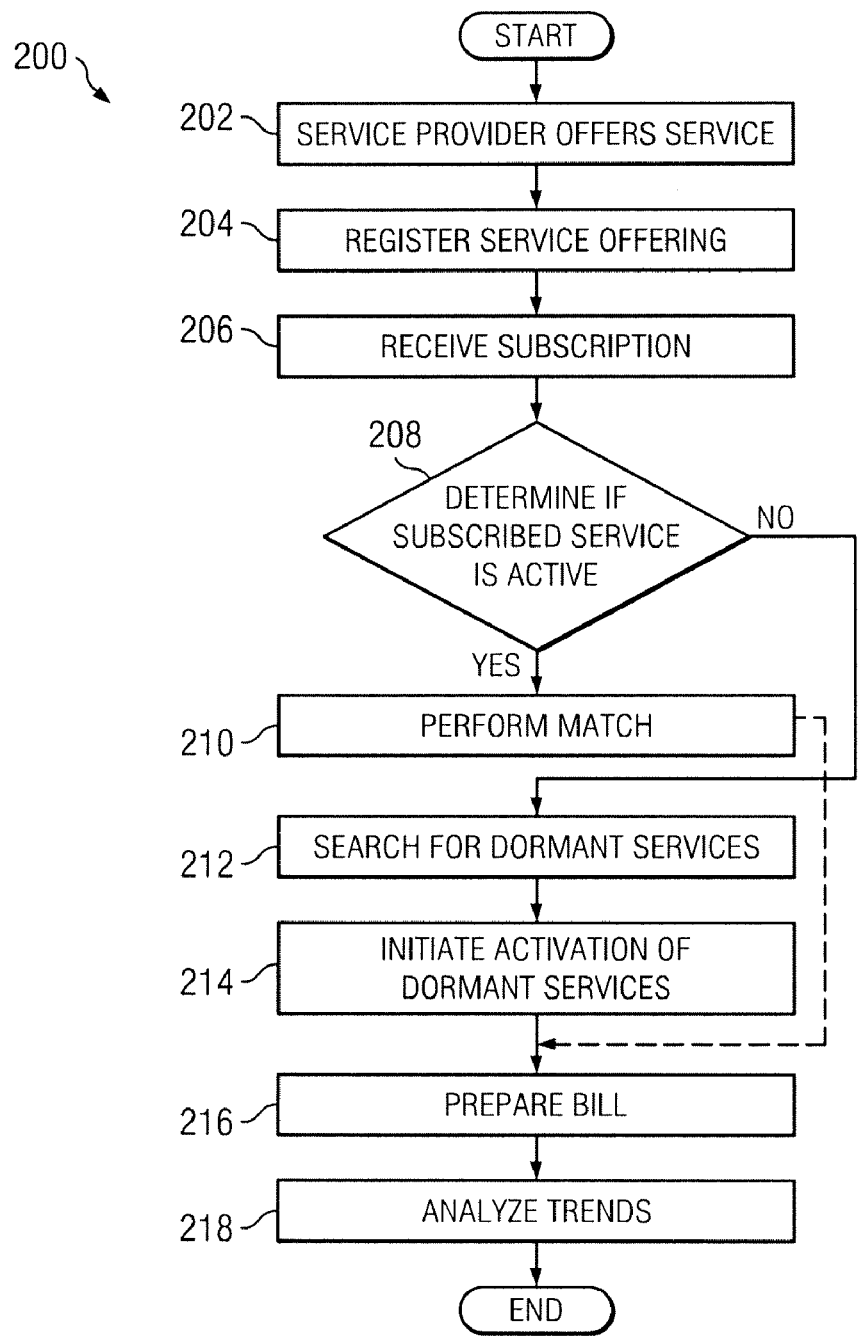
FIG. 4 is a flow chart illustrating a method for using cloud brokering services for opportunistic cloud offerings.

FIG. 4 is a flow chart illustrating a method 200 for using cloud brokering services for opportunistic cloud offerings. The method begins at step 202 where a service provider may offer a service. The service may be an active (available) service or a dormant (potential service). The brokering system may register the service in the match-making component at step 204. In some embodiments, registering the service may include publishing the service for potential consumers to browse. An active service may include a description, availability time, price, etc. A dormant service may include an indicator that the service is dormant and, thus, might not include certain information, such as an availability time.

At step 206, the brokering system may receive a subscription from a consumer. The subscription may request the brokering system to broker a transaction for a service. The service may be selected from the published list of active and/or dormant services presented by the match-making component. In the event that several similar services are available, the subscription request may include an order or prioritization indicating the consumer's preference for receiving the service. The preference may indicate a preferred service provider, a preferred availability time, or other characteristic.

The brokering system may determine if the subscribed service is active at step 208. If the service is active, the brokering system performs the match at step 210. For example, match-making system may assign an activation code and send the activation code to the connectivity components of the selected service provider and consumer. The match-making component may log the match in the analytics engine to be used for trends analysis.

If the brokering system determines that the service is dormant in step 208, the method may proceed to step 212 to search for dormant services. In some embodiments, the match-making component may forward the request to the demand engine to search for potential dormant services. When the demand engine locates a potential offering, it may connect to the service provider's opportunistic notification adapter and report the request. If the service provider is available to provide the service, the demand engine may get a commitment from the connectivity component of the consumer and may immediately notify the notification adapter of the service provider to provision the service using a token, which may be generated by the provisioning adapter of the service provider.

Once a service has been initiated successfully, the billing and accounting component is notified to monitor the transaction and prepare a bill at step 216. The services monitored by the billing engine include active services initiated at step 208 as well as dormant services that were activated and initiated at step 214.

At step 218, the billing and accounting component reports to the analytics engine for further analysis of trends. The method then ends.

Modifications, additions, or omissions may be made to the systems described herein without departing from the scope of the invention. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

The systems and methods described may provide one or more advantages. As an example, service providers may offer services to consumers on an opportunistic basis in order to generates additional income and/or reduce operating expenses associated with information technology systems of the service providers. As another example, services may be offered to consumers at reduced prices. As yet another example, brokers may offer publishing, match-making, accounting, trending, or other transactions that enable the brokers to collect transaction fees. Various embodiments may include all, some, or none of the enumerated advantages.

Although the present disclosure has been described with several embodiments, numerous changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
    facilitating a first transaction for a first party, the first party configured as a consumer of a requested cloud-based computing service with respect to the first transaction, wherein facilitating the first transaction comprises:
        publishing descriptions for a plurality of published services, the descriptions available from a plurality of publishing parties;
        receiving, by a processor, a request to broker the first transaction from a requesting party, the request indicating the requested cloud-based computing service, the requested cloud-based computing service selected from the plurality of published services; and
        associating the requested cloud-based computing service to one of the published services; and
    the method further comprising facilitating a second transaction for the first party, the first party configured as a service provider of a custom cloud-based computing service with respect to the second transaction, the custom cloud-based computing service incorporating the requested cloud-based computing service.

2. The method of claim 1, wherein the first party corresponds to the requesting party with respect to the first transaction.

3. The method of claim 1, further comprising:
    calculating an account balance for the requesting party by:
        determining whether the first transaction is a consumer transaction or a provider transaction of the requesting party;
        if the first transaction is a consumer transaction, deducting the amount owed for the first transaction from the account balance; and
        if the first transaction is a provider transaction, crediting the amount earned from the first transaction to the account balance.

4. The method of claim 1, further comprising calculating a fee for facilitating the transactions.

5. The method of claim 1, further comprising:
    determining whether the requesting party belongs to a consortium associated with a selected publishing party associated with the one of the published services; and
    allowing the first transaction only if the requesting party belongs to the consortium associated with the selected publishing party.

6. The method of claim 1, further comprising associating the requested cloud-based computing service to the one of the published services only if the one of the published services meets or exceeds a service level requested by the requesting party.

7. The method of claim 1, wherein:
    the plurality of published services comprises active services and dormant services and the requested cloud-based computing service comprises one of the dormant services; and
    the facilitating the transaction for the one of the published services further comprises facilitating negotiations to activate the one of the dormant services.

8. A brokering system for cloud-based computing services, the system comprising:

one or more processors operable to:
publish descriptions for a plurality of published services, the descriptions available from a plurality of publishing parties; and
an interface comprising hardware and operable to:
receive a request to broker a first transaction from a requesting party, the request indicating a requested cloud-based computing service, the requested cloud-based computing service selected from the plurality of published services; and
the one or more processors further operable to:
associate the requested cloud-based computing service to one of the published services;
facilitate the first transaction for the one of the published services on behalf of a first party, the first party configured as a consumer of the requested cloud-based computing service with respect to the first transaction; and
facilitate, by the one or more processors, a second transaction for the first party, the first party configured as a service provider of a custom cloud-based computing service with respect to the second transaction, the custom cloud-based computing service incorporating the first-requested cloud-based computing service.

9. The system of claim 8, wherein the first party corresponds to one of the publishing parties with respect to the first transaction.

10. The system of claim 8, the one or more processors further operable to:
calculate an account balance for the requesting party by:
determining whether the first transaction is a consumer transaction or a provider transaction of the requesting party;
if the first transaction is a consumer transaction, deducting the amount owed for the first transaction from the account balance;
if the first transaction is a provider transaction, crediting the amount earned from the first transaction to the account balance; and
applying a fee for facilitating the first transaction to the account balance.

11. The system of claim 8, the one or more processors further operable to associate the requested cloud-based computing service to the one of the published services only if the one of the published services meets or exceeds a service level requested by the requesting party.

12. A non-transitory computer-readable medium storing logic when executed by a processor configured to:
facilitate a first transaction for a first party, the first party configured as a consumer of a requested cloud-based computing service with respect to the first transaction, wherein to facilitate the first transaction the logic is configured to:
publish descriptions for a plurality of published services, the descriptions available from a plurality of publishing parties;
receive a request to broker the first transaction from a requesting party, the request indicating the requested cloud-based computing service, the requested cloud-based computing service selected from the plurality of published services; and
associate the first-requested cloud-based computing service to one of the published services; and
the logic further configured to facilitate a second transaction for the first party, the first party configured as a service provider of a custom cloud-based computing service with respect to the second transaction, the custom cloud-based computing service incorporating the requested cloud-based computing service.

13. The logic of claim 12, wherein the first party corresponds to the requesting party with respect to the first transaction.

14. The logic of claim 12, further configured to:
calculate an account balance for the first party by:
determining that the first transaction is a consumer transaction and deducting the amount owed for the first transaction from the account balance;
determining that the second transaction is a provider transaction and crediting the amount earned from the second transaction to the account balance; and
applying a fee for facilitating the first transaction to the account balance.

15. The logic of claim 12, further configured to associate the requested cloud-based computing service to the one of the published services only if the one of the published services meets or exceeds a service level requested by the requesting party.

* * * * *